(12) United States Patent
Shim

(10) Patent No.: US 6,263,274 B1
(45) Date of Patent: Jul. 17, 2001

(54) FAIL-SAFE CONTROL METHOD FOR AUTOMATIC TRANSMISSION HAVING ONE-WAY CLUTCH

(75) Inventor: Hyun-Soo Shim, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/597,962

(22) Filed: Jun. 20, 2000

(30) Foreign Application Priority Data

Mar. 12, 1999 (KR) .................................................. 99-54755

(51) Int. Cl.[7] .............................. G06F 7/00; G06F 17/00; G06F 19/00
(52) U.S. Cl. .............................. 701/62; 701/64; 477/34; 477/62
(58) Field of Search .................................. 701/62, 64, 67, 701/39; 477/34, 62, 63, 68

(56) References Cited

U.S. PATENT DOCUMENTS 5,060,158 * 10/1991 Kono et al. ............................ 701/67
6,002,976 * 12/1999 Hollstein et al. ...................... 701/51

\* cited by examiner

*Primary Examiner*—William A. Cuchlinski, Jr.
*Assistant Examiner*—Olga Hernandez
(74) *Attorney, Agent, or Firm*—Christie, Parker & Hale, LLP

(57) ABSTRACT

Disclosed is a fail-safe control method for an automatic transmission having a one-way clutch comprising the steps of determining if shifting into a drive D range is completed; determining if synchronization into a first speed has occurred; and determining if roll-over of a one-way clutch has occurred, and if it has, controlling a friction element of a hydraulic control system so that forced shifting into the first speed is performed.

7 Claims, 2 Drawing Sheets

FAIL-SAFE CONTROL METHOD FOR AUTOMATIC TRANSMISSION HAVING ONE-WAY CLUTCH

BACKGROUND OF THE INVENTION (a) Field of the Invention

The present invention relates to a fail-safe control method for an automatic transmission having a one-way clutch in which, when one-way clutch roll-over occurs, shifting is performed into a second speed from a first speed after a forced downshift operation into the first speed is effected, thereby carrying out a fail-safe operation.

(b) Description of the Related Art

A one-way clutch is typically provided at two locations: between a planet carrier of a planetary gearset and a center support in a sprag configuration or on a stator of a torque converter. The one-way clutch transmits power in only one direction.

Since a long pinion of the one-way clutch of the planetary gearset rotates clockwise when in a first speed of a drive D range or a low 2 range, the counterclockwise rotation of the planet carrier of the planetary gearset is impeded such that drive power is transmitted to a ring gear of the planetary gearset. Accordingly, the planet carrier is able to rotate only clockwise and free-wheels in a clockwise direction during engine braking such that shifting into the second speed from the first speed is performed smoothly.

However, in the case where the one-way clutch of the transmission undergoes roll-over, driving in the first speed is not possible and a situation results in which engine rpm abruptly increase. In conventional vehicles, although there are systems which alert the driver that a malfunction has occurred, no internal countermeasure is taken when such a problem arises.

SUMMARY OF THE INVENTION

The present invention has been made in an effort to solve the above problems.

It is an object of the present invention to provide a fail-safe control method for an automatic transmission having a one-way clutch in which, when one-way clutch roll-over occurs, shifting is performed into a second speed from a first speed after a forced downshift operation into the first speed is effected, thereby carrying out a fail-safe operation.

To achieve the above object, the present invention provides a fail-safe control method for an automatic transmission having a one-way clutch comprising the steps of determining if shifting into a drive D range is completed; determining if synchronization into a first speed has occurred; and determining if roll-over of a one-way clutch has occurred, and if it has, controlling a friction element of a hydraulic control system so that forced shifting into the first speed is performed.

According to a feature of the present invention, the step of determining if synchronization into the first speed has occurred is performed by determining if engine rpm are greater than 450 rpm, transmission output rpm are greater than 350 rpm, and an inhibitor switch is performing input while not transmitting repeating signals, and if the inhibitor switch is performing normal output of signals, determining if a difference between a first turbine rpm when shifting into the drive D range and a second turbine rpm when a 0% duty ratio is output is greater than a predetermined value.

According to another feature of the present invention, in the step of determining if roll-over of the one-way clutch has occurred and controlling the friction element so that forced shifting into the first speed is performed, the friction element is a low-reverse brake and is controlled to a 100% duty ratio such that synchronization into the first speed occurs.

According to yet another feature of the present invention, a self-diagnostic test is performed if it is determined that synchronization into the first speed has not occurred.

According to still yet another feature of the present invention, the self-diagnostic test is performed three or more times.

According to still yet another feature of the present invention, if synchronization into the first speed is continuously not realized, it is determined that roll-over of the one-way clutch has occurred and a warning signal is output to the driver.

According to still yet another feature of the present invention, a signal to control the friction element of a 0% duty ratio is output if it is determined that shifting into the drive D range is completed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
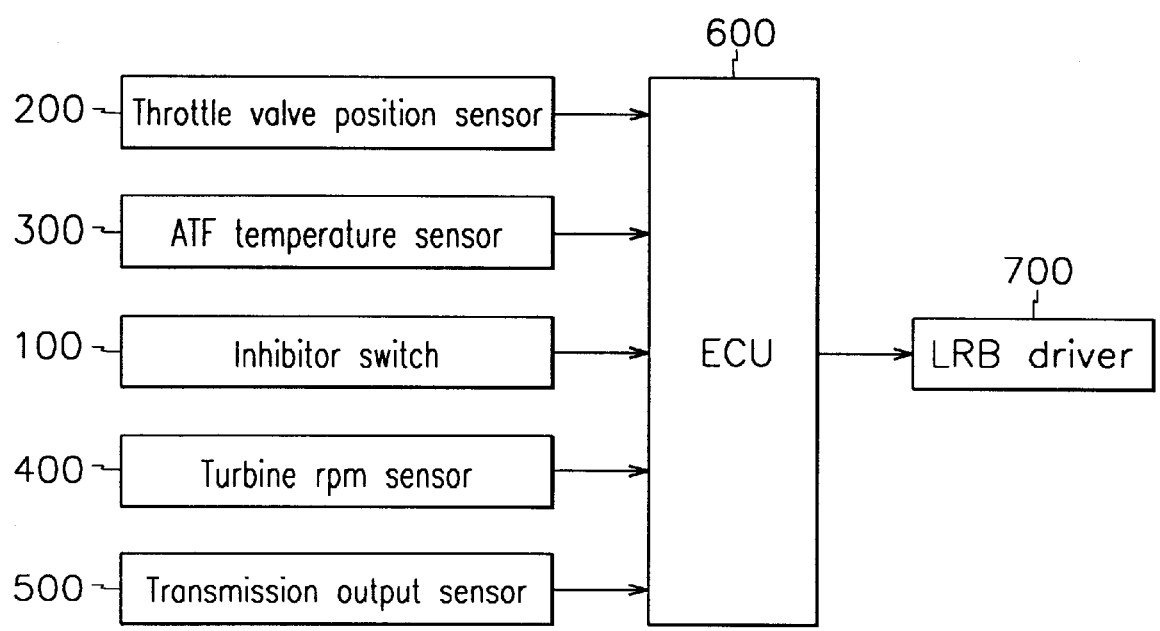
FIG. 1 is a block diagram of various elements of a vehicle to which a fail-safe control method according to a preferred embodiment of the present invention is applied.

FIG. 1 shows a block diagram of various elements of a vehicle to which a fail-safe control method according to a preferred embodiment of the present invention is applied.

Elements of a vehicle to which a fail-safe control method of the present invention is applied include an inhibitor switch 100, a throttle valve position sensor 200, an automatic transmission fluid (ATF) temperature sensor 300, a turbine rpm sensor 400, a transmission output sensor 500, an electronic control unit (ECU) 600, and a low-reverse brake (LRB) driver 700.

The inhibitor switch 100 detects the movement of a shift lever to various positions corresponding to the different shift ranges and outputs corresponding signals; the throttle valve position sensor 200 detects throttle valve opening, which varies according to driver manipulation of an accelerator pedal, and outputs corresponding signals; the ATF temperature sensor 300 detects a temperature of automatic transmission fluid and outputs corresponding signals; the turbine rpm sensor 400 detects rpm of a turbine of a torque converter and outputs corresponding signals; and the transmission output sensor 500 detects output rpm of a transmission and outputs corresponding signals, the transmission receiving an output of the torque converter through the turbine and varying this rotational force before outputting the same.

After receiving the signals from the inhibitor switch 100, the throttle valve position sensor 200, the ATF temperature sensor 300, the turbine rpm sensor 400, and the transmission output sensor 500, the ECU 600 determines a present shift range of the vehicle and also whether roll-over of the one-way clutch has occurred. If the one-way clutch has undergone roll-over, the ECU controls the LRB driver 700 so that shifting into the second speed is realized.

Figure 2:
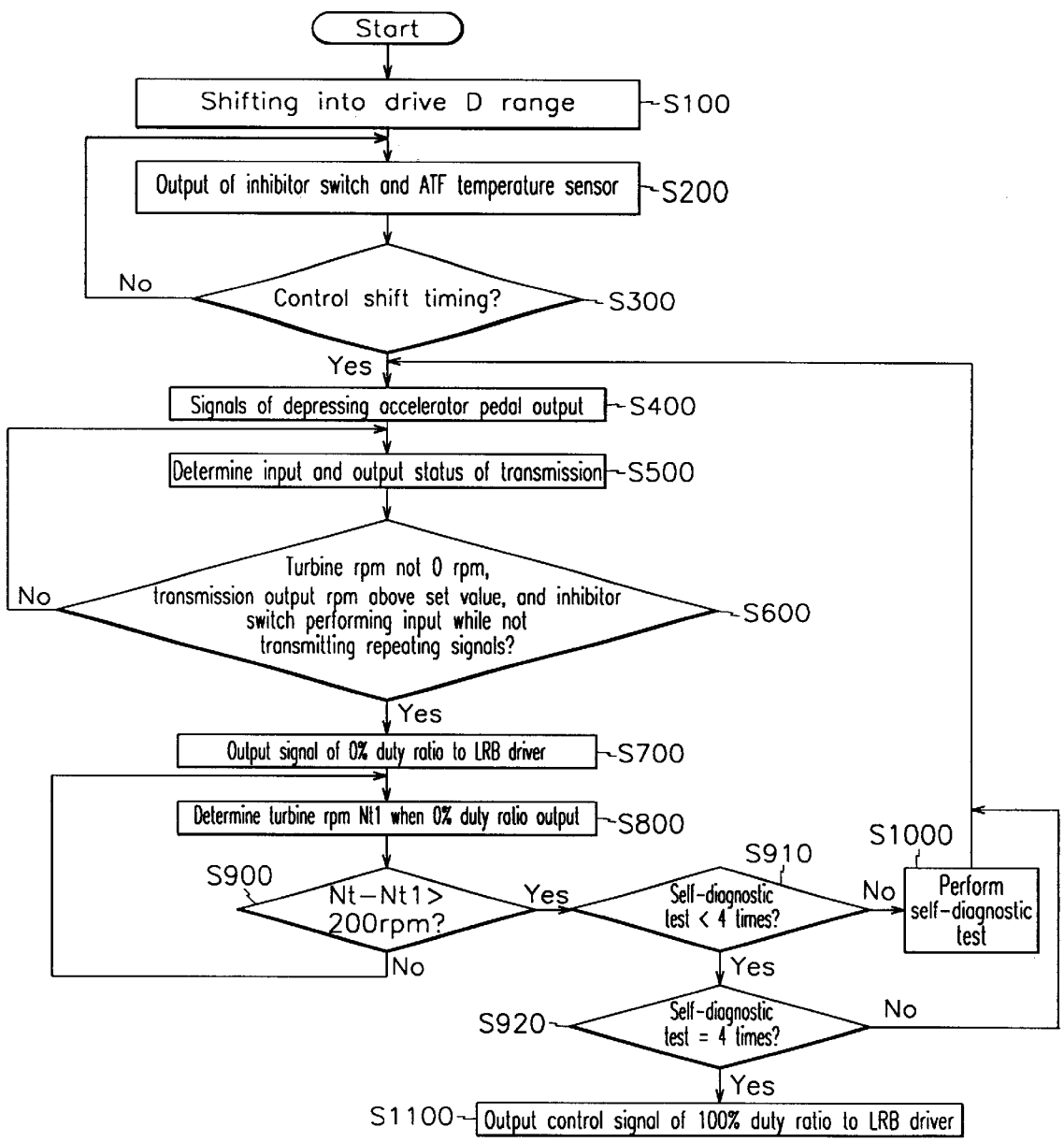
FIG. 2 is a flow chart of a fail-safe control method for an automatic transmission having a one-way clutch according to a preferred embodiment of the present invention.

FIG. 2 shows a flow chart of a fail-safe control method for an automatic transmission having a one-way clutch according to a preferred embodiment of the present invention.

If the driver controls the shift lever into a drive D range in step S100, the inhibitor switch 100 detects this re-positioning of the shift lever and outputs a corresponding signal to the ECU 600, and the ATF temperature sensor 300 outputs the change in ATF temperature to the ECU 600 in step S200. Using these signals, the ECU 600 determines that the shift lever has been positioned in the drive D range. In particular, if an output voltage of the inhibitor switch 100 is 10V or greater and the AFT temperature sensor 300 outputs a signal corresponding to a temperature of 23° C. or greater, the ECU 600 determines that the shift lever has been positioned in the drive D range. Accordingly, the ECU 600 controls a shift timing in step S300.

Subsequently, if the driver depresses the accelerator pedal in the drive D range to increase the speed of the vehicle, corresponding signals are output to the ECU 600 by the throttle valve position sensor 200 in step S400. Following this step, the ECU 600 determines input and output states of the transmission from the signals output by the turbine rpm sensor 400 and the transmission output sensor 500 in step S500.

Next, the ECU 600 determines if turbine rpm are not 0 rpm, transmission output rpm are above a predetermined value, and the inhibitor switch 100 is performing input while not transmitting repeating signals in step S600. If these conditions are met, the ECU 600 outputs a signal of a 0% duty ratio to the LRB driver 700 in step S700 such that the LRB driver 700 does not perform control of the LRB.

At the point where a 0% duty ratio is output to the LRB driver 700, the ECU 600 determines turbine rpm from the signals output by the turbine rpm sensor 400 in step S800. Next, in step S900, the ECU determines if a difference between turbine rpm Nt when shifting into the drive D range and turbine rpm Nt1 when a 0% duty ratio is output is greater than 200 rpm, and if engine rpm Ne are greater than 450 rpm in step S900. In step S900, there must be values that are greater for one second or more before it is determined that this condition is satisfied. If the condition of step S900 is found to be satisfied, this indicates that synchronization into the first speed has not been realized.

Subsequently, the ECU 600 determines if the number of times a self-diagnostic test has been performed is less four in step S910. If the number is less than four, the ECU 600 performs a self-diagnostic test in order to effect synchronization into the first speed in step S1000, after which the process is returned to step S400.

This process is repeated (i.e., steps S400–S1000 are repeated) until synchronization into the first speed is realized or until it is determined in step S920 that the self-diagnostic test has been performed four times. If the self-diagnostic test has been performed four times, the ECU 600 outputs a control signal of a 100% duty ratio to the LRB driver 700 in step S1100 such that the LRB is operated, resulting in the planet carrier of the planetary gearset being held stationary so that forced shifting into the first speed occurs.

In the method of the present invention as described above, by operating the LRB during roll-over of the one-way clutch, forced shifting into the first speed is realized, thereby preventing the abrupt increase in engine rpm that typically accompanies one-way clutch roll-over.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A fail-safe control method for an automatic transmission having a one-way clutch comprising the steps of:

determining if shifting into a drive D range is completed;

determining if synchronization into a first speed has occurred; and determining if roll-over of a one-way clutch has occurred, and if it has, controlling a friction element of a hydraulic control system so that forced shifting into the first speed is performed.

2. The method of claim 1 wherein the step of determining if synchronization into the first speed has occurred is performed by determining if engine rpm are greater than 450 rpm, transmission output rpm are greater than 350 rpm, and an inhibitor switch is performing input while not transmitting repeating signals, and if the inhibitor switch is performing normal output of signals, determining if a difference between a first turbine rpm when shifting into the drive D range and a second turbine rpm when a 0% duty ratio is output is greater than a predetermined value.

3. The method of claim 1 wherein in the step of determining if roll-over of the one-way clutch has occurred and controlling the friction element so that forced shifting into the first speed is performed, the friction element is a low-reverse brake and is controlled to a 100% duty ratio such that synchronization into the first speed occurs.

4. The method of claim 3 further comprising the step of performing a self-diagnostic test if it is determined that synchronization into the first speed has not occurred.

5. The method of claim 4 wherein the self-diagnostic test is performed three or more times.

6. The method of claim 4 wherein if synchronization into the first speed is continuously not realized, it is determined that roll-over of the one-way clutch has occurred and a warning signal is output to the driver.

7. The method of claim 1 further comprising the step of outputting a signal to control the friction element of a 0% duty ratio if it is determined that shifting into the drive D range is completed.

* * * * *